United States Patent [19]

Ichinose et al.

[11] Patent Number: 4,987,487

[45] Date of Patent: Jan. 22, 1991

[54] METHOD OF STEREOSCOPIC IMAGES DISPLAY WHICH COMPENSATES ELECTRONICALLY FOR VIEWER HEAD MOVEMENT

[75] Inventors: Susumu Ichinose; Nobuji Tetsutani, both of Yokosuka; Morito Ishibashi, Yokohama, all of Japan

[73] Assignee: Nippon Telegraph and Telephone Corporation, Tokyo, Japan

[21] Appl. No.: 391,881

[22] Filed: Aug. 9, 1989

[30] Foreign Application Priority Data

Aug. 12, 1988 [JP] Japan .................................. 63-199955
Oct. 15, 1988 [JP] Japan .................................. 63-258362
Feb. 27, 1989 [JP] Japan ................................... 64-46220

[51] Int. Cl.⁵ .............................................. H04N 13/00
[52] U.S. Cl. .................................... 358/92; 358/88; 358/91; 350/131
[58] Field of Search ....................... 358/88, 89, 91, 92, 358/3; 350/167, 131; 354/112–115

[56] References Cited

U.S. PATENT DOCUMENTS

4,214,257  7/1980  Yamauchi ........................ 358/92 X
4,571,616  2/1986  Haisma et al. ...................... 358/88
4,852,972  8/1989  Wah Lo ........................ 354/115 X

FOREIGN PATENT DOCUMENTS

87291  5/1982  Japan .

*Primary Examiner*—Victor R. Kostak
*Attorney, Agent, or Firm*—Ladas & Parry

[57] ABSTRACT

A method for providing stereoscopic image display in which right and left eye images are transmitted to the right and left eyes of a viewer by a lenticular lens sheet. The sheet consists of an array of lenticular lenses and a combined image obtained by combining pixels for right and left eye images with binocular disparity data. To maintain stereoscopic alignment when the viewer moves, this method detects the position of the viewer and, accordingly shifts the positions of the pixels for the right and left eye images on the combined image; thus, the right and left eye images are always correctly transmitted to the right and left eyes of the viewer.

7 Claims, 15 Drawing Sheets

METHOD OF STEREOSCOPIC IMAGES DISPLAY WHICH COMPENSATES ELECTRONICALLY FOR VIEWER HEAD MOVEMENT

BACKGROUND OF THE INVENTION

1. Field of the Invention

The present invention relates to a technique stereoscopic image display applicable to stereoscopic television sets, stereoscopic video recorders/players, stereoscopic videotelephones for effective communications at remote locations, and the like.

2. Description of Prior Art

Conventional techniques of displaying a stereoscopic image (three-dimensional image) include a glass scheme using specific glasses, and using a lenticular lens sheet. In the case of glasses a stereoscopic image is displayed and polarized glasses, liquid-crystal glasses, or an anaglyph scheme are used. A disadvantage of this system is the need for the viewer to wear glasses. This is particularly the case since the parties will be seen wearing glasses which may not be normal.

On the other hand, the technique of displaying a stereoscopic image using a lenticular lens sheet can be of direct viewing type wherein the lenticular lens sheet is arranged on the surface of a display such as a CRT, a liquid-crystal display, or the like, or at projection type in which an image is projected on a lenticular lens sheet using a projector.

With the lenticular lens sheet scheme, a viewer can watch a stereoscopic image without wearing glasses. However, in order to assure stereoscopic viewing over a wide field, a large number of images projected from 6 to 8 places are required, and the arrangement of the apparatus becomes complicated and expensive. To realize such stereoscopic viewing by images projected from two places, a technique is known for mechanically tracking the head of the viewer (e.g., Alfred Schwartz; "Head Tracking Display" IEEE Trans. ED-33, 8 (Aug, 1986)). However, a tracking speed is limited due to its mechanical operation.

SUMMARY OF THE INVENTION

It is an object of the present invention to provide a method of stereoscopic image display which can assure electronic stereoscopic viewing within a wide range without using glasses.

It is another object of the present invention to provide a method which can eliminate the drawback of the formation of discontinuous stereoscopic image formed when a viewer moves his or her head, and which can continuously and naturally display a stereoscopic image and can expand an area capable of stereoscopic viewing.

It is still another object of the present invention to provide a method which can assure stereoscopic viewing within a wide range both for direct viewing and projection type display.

According to the present invention, when a stereoscopic image from a lenticular lens sheet associated with a combined image produced by combining pixels for right and left eye images each having a binocular disparity, is viewed the binocular position of the viewer is detected by a detection means so that the pixel for the left eye image is always incident on the left eye and the pixel for the right eye image is always incident on the right eye, and the positions of the pixels for the right and left eye images on the combined image are changed on the basis of the detection signal according to the binocular position of the viewer.

More specifically, when the direct viewing type display is employed, right and left eye images, which may be displayed by device such as a liquid-crystal display, are controlled by detecting the binocular position of the viewer. When the projection type display is employed, a right or left eye image signal, which is input to a corresponding one of two (or a plurality of sets of) projectors, is controlled by detecting the binocular position of the viewer.

According to the present invention, in order to allow stereoscopic viewing of the entire display screen, the pitch of each lenticular lens is set to be slightly smaller than the repetitive pitch of a pair of pixels for right and left eye images on the combined image, so that the centers of all the pairs of pixels for the right and left eye images are projected to the center of the two eyes.

Furthermore, according to the present invention, each pixel of a pair of pixels for right and left eye images corresponding to one pitch of the lenticular lens is constituted by a plurality of micropixels, and the positions of pixels for the right and left eye images on the combined image are changed in units of micropixels, thus expanding the area capable of stereoscopic viewing.

BRIEF DESCRIPTION OF THE DRAWINGS

FIGS. 1 to 4 show the principle of the present invention, in which

FIG. 1 is a top view showing the condition near a display screen,

FIG. 2 is a top view showing the condition near a viewer,

FIG. 3 is a top view simultaneously showing the condition near the display screen and the viewer when the viewer is directly front of the display screen, and FIG. 4 is a top a view simultaneously showing the condition near the display screen and the viewer when the viewer moves to the right or left from the initial position;

FIGS. 5(A) and 5(B) show the arrangement of a projection type display, in which

FIG. 5(A) shows a projection display with a front projection screen, and FIG. 5(B) shows the projection display with a back projection screen;

DETAILED DESCRIPTION OF THE PREFERRED EMBODIMENT

The present invention will now be described in detail with reference to the accompanying drawings.

Figure 1:
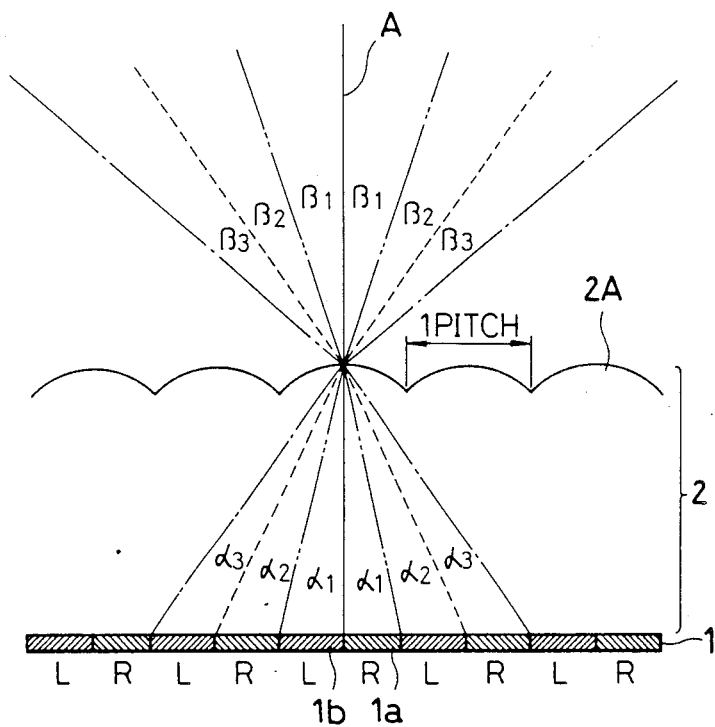

FIGS. 1 to 4 are top views for explaining the principle of the present invention. FIG. 1 shows the condition state near a display screen (direct viewing type) or a diffusive layer (projection type). In FIG. 1, reference numeral 1 denotes a combined image obtained by combining pixels for a left eye image (to be referred to as L pixels hereinafter) and pixels for a right eye image (to be referred to as R pixels hereinafter). Each pair of R and L pixels correspond to a respective lens 2A, the lenses 2A constituting a lenticular lens sheet 2. The combined image 1 is formed on focal plane of the lenticular lenses 2A. A description will follow with reference to a light beam passing through the central lenticular lens 2A. Light emerging from the right end of an R pixel 1a located immediately below the central lenticular lens 2A is incident on the lenticular lens 2A at an angle $\alpha_1$. Similarly, light emerging from the left end of an L pixel 1b is incident on the lenticular lens 2A at the same angle $\alpha_1$. These light beams comply with the law of refraction expressed by the following equation when they emerge from the lenticular lens 2A:

$$n \cdot \sin(\alpha_1) = \sin(\beta_1)$$

where $\beta_1$ is the emerging angle, and n is the refractive index of the lenticular lens 2A. In this arrangement, when the position of a viewer is set so that a line extending perpendicularly to the combined image 1 passes through the center between the two eyes of the viewer, the viewer will have stereoscopic viewing. Since the R and L pixels are arranged adjacent to each other, light beams which are incident at an angle $\alpha_2$ and emerge at an angle $\beta_2$ are present outside the light beams emerging from the R and L pixels 1a and 1b, and light beams which are incident at an angle $\alpha_3$ and emerge at an angle $\beta_3$ are similarly present outside these light beams.

Figure 2:
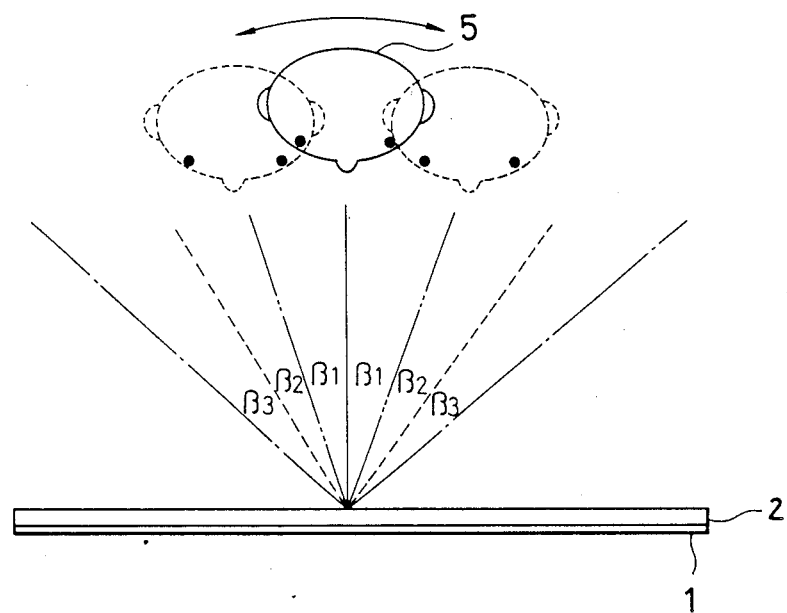

FIG. 2 shows the above-mentioned state together with as the viewer. In FIG. 2, when a viewer 5 is located at the central position indicated by a solid line, since light beams emerging at the angle $\beta_1$ are incident on his or her two eyes, the viewer will experience stereoscopic viewing. However, when the viewer 5 moves to the right or left and is located at a position indicated by the dotted lines, light components corresponding to L pixels are incident on the right eye and light components corresponding to R pixels are incident on the left eye, so that stereoscopic viewing cannot be assured. However, if the viewer 5 moves to the position indicated by the dotted lines and positions of the R and L pixels on the combined image 1 are reversed, stereoscopic viewing is obtained.

Figure 3:
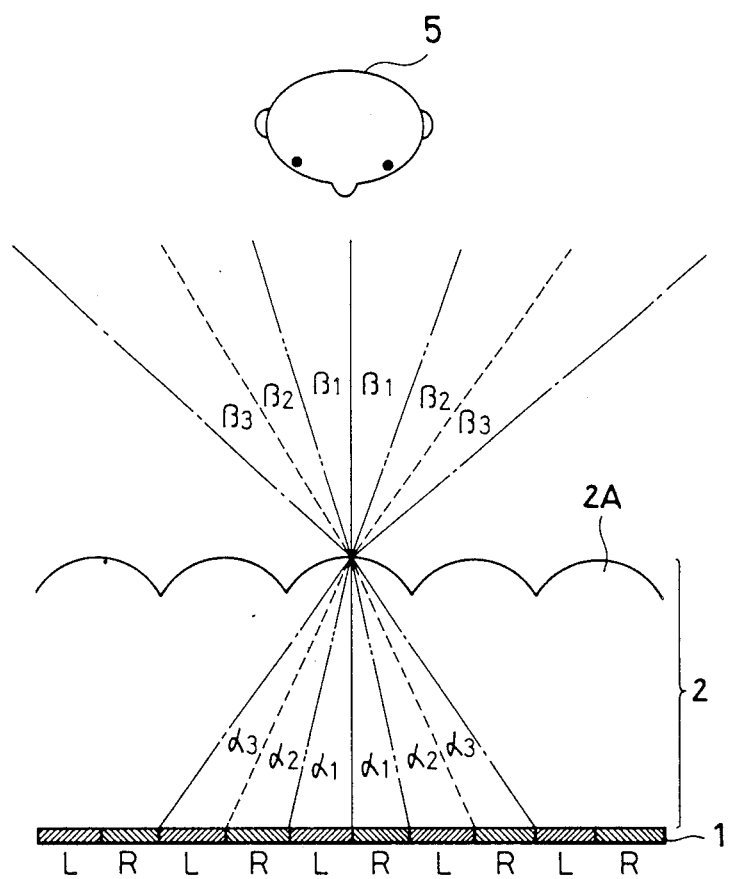
Figure 4:
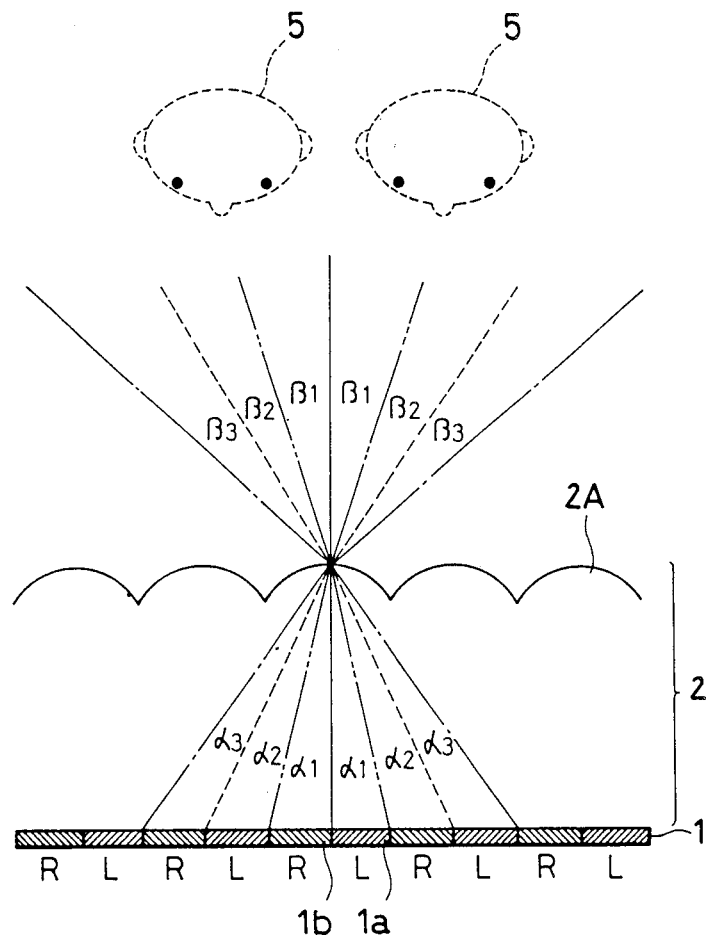

FIG. 3 shows a state wherein the viewer 5 is located directly just in front of the display screen, and FIG. 4 shows a state wherein the viewer 5 moves to the right or left. In FIGS. 3 and 4, the lenticular lens 2A is enlarged and the viewer 5 is reduced in scale for the sake of convenience. FIG. 3 simultaneously shows the relationship between FIGS. 1 and 2. A right eye light beam emerging from the R pixel 1a is incident on the right eye of the viewer 5, and a left eye light beam emerging from the L pixel 1b is incident on the left eye, thus achieving stereoscopic viewing. In FIG. 4, when the viewer 5 moves to the right or left and emerging light beams at the angles $\beta_1$ and $\beta_2$ are incident on two eyes, if the R and L pixels on the combined image 1 are reversed from those shown in FIG. 3, light components corresponding to R and L pixels are respectively incident on the right and left eyes of the viewer 5, thus achieving stereoscopic viewing. In order to reverse the R and L pixels on the combined image 1, right and left eye signals input to display elements of a display device can be reversed in a direct viewing type display. On the other hand, in a projection type display, right and left eye image signals input to projectors are reversed. When the observer 5 further moves to the right or left and light beams at angles $\beta_2$ and $\beta_3$ are incident on the two eyes of the viewer 5, the combined image 1 can be controlled to have the same array of pixels as that shown in FIG. 3. When the viewer moves further to a position where he or she still receives outer light beams, the combined image 1 can be controlled to have the same array of pixels as that shown in FIG. 4, thus assuring stereoscopic viewing. More specifically, a binocular or head position of the viewer 5 is detected to control the array of pixels on the combined image 1, so that stereoscopic viewing can be attained even if the viewer 5 moves.

Note that a method for detecting the binocular or head position of the viewer is known to those who are skilled in the art (reference: Proc. of SPIE, Visual Communication and Image Processing, 1988, Vo. 1001, K. OHMURA et al.), and a binocular or head position detecting means is commercially available (e.g., infrared sensor: $E_3SA\text{-}DS50C_{43}A$ available from OMRON TATEISHI ELECTRONICS CO., ultrasonic sensor: $PS_1\text{-}D_1$ MN available from FUJI ELECTRIC CO., LTD., and the like.)

The arrangement and principle of the projection type display will be described below.

Figure 5A:
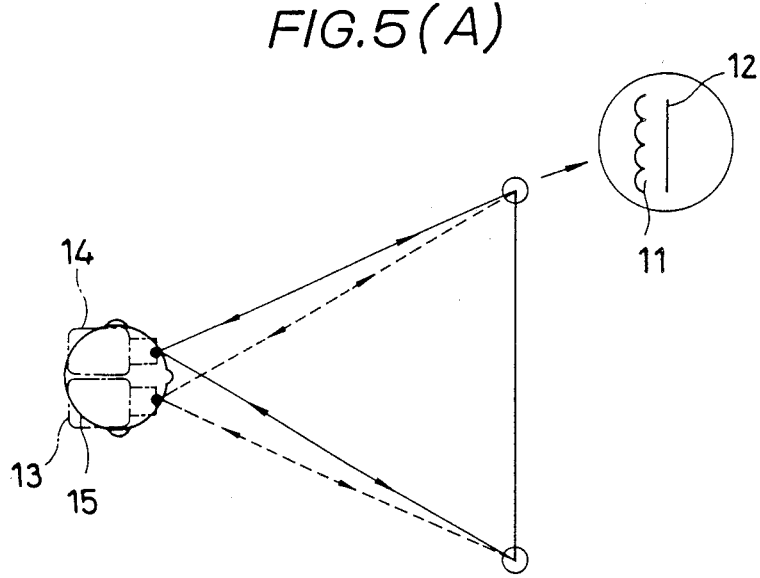
Figure 5B:
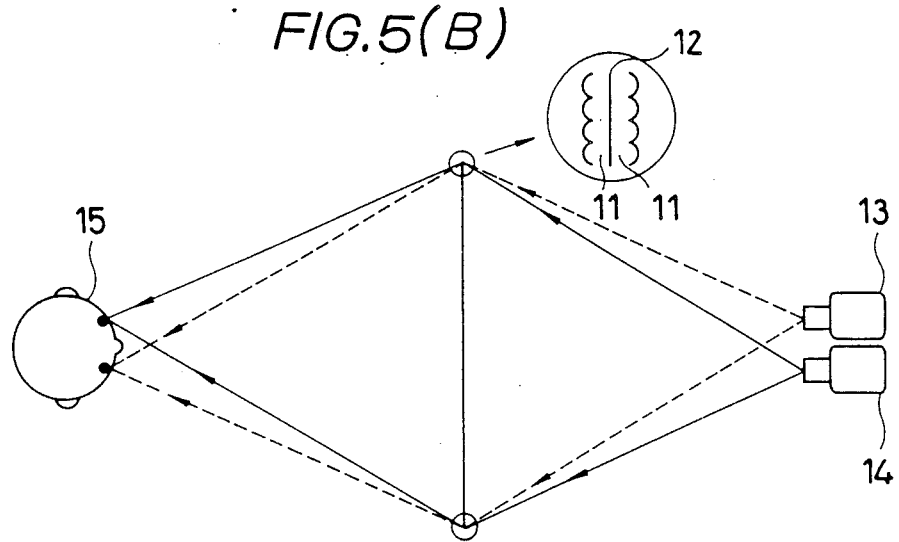

FIGS. 5(A) and 5(B) show top views of the arrangement of the projection type display. More specifically, FIG. 5(A) shows the arrangement of a projection display with a front projection screen, and FIG. 5(B) shows the arrangement of a projection display with a back projection screen. In FIGS. 5(A) and 5(B), reference numeral 11 denotes a lenticular lens sheet; 12, a diffusive layer arranged on the rear surface of the lenticular lens sheet; 13, a projector for projecting a right eye image toward the lenticular lens sheet; 14, a projector for projecting a left eye image; and 15, a viewer represents.

In the projection display with the front projection screen shown in FIG. 5(A), The projectors 13 and 14 are arranged immediately above or below the two eyes of the viewer 15. When the projectors 13 and 14 project right and left eye images, respectively, onto the lenticular lens sheet 11, light beams emerging from the projectors 13 and 14 are reflected by the diffusive layer 12 onto the rear surface of the lenticular lens sheet 11, and return along the same path as the incident light beams. As indicated by dotted lines, the light beam projected from projector 13 reaches the right eye of the viewer 15, and the light beam projected from projector 14 indicated by the solid line, reaches the left eye of the viewer 15. As a result, the viewer sees a stereoscopic image on the lenticular lens sheet. More specifically, an image projected from the projectors is focused on the diffusive layer arranged on the rear surface of the lenticular lens sheet as a combined image consisting of R and L pixels, and the viewer stereoscopically views the focused image through the lenticular lens sheet, as shown in FIG. 4.

In the projection display with the back projection screen shown in FIG. 5(B), two lenticular lens sheets, 11, are in tight contact with each other to sandwich the diffusive layer 12 therebetween. The projectors 13 and 14 and the viewer 15 are symmetrically arranged with respect to the lenticular lens sheets. With this arrangement, when the projector 13 projects a right eye image and the projector 14 projects a left eye image, the light beam emerging from the projector 13 passes through the lenticular lens sheets 11 and then reaches the right eye of the viewer 15, as indicated by dotted lines, and the light beam emerging from the projector 14 reaches the left eye of the viewer, as indicated by solid lines. Thus, the viewer sees a stereoscopic image in the same manner as in the projection display shown in FIG. 5(A).

The above description has been given for the case wherein two projectors are used. Of course, more than two projectors may be used to project images.

Note that the principle of operation of these projectors is known to those who are skilled in the art, and a detailed description thereof will be omitted (reference: "Three-Dimensional Image Optics", T. OHKOSHI, Sangyo Tosho Shuppan, Co.)

The arrangement of the embodiment of the present invention using the principle shown in FIGS. 1 to 5(B) will be described below.

Figure 6:
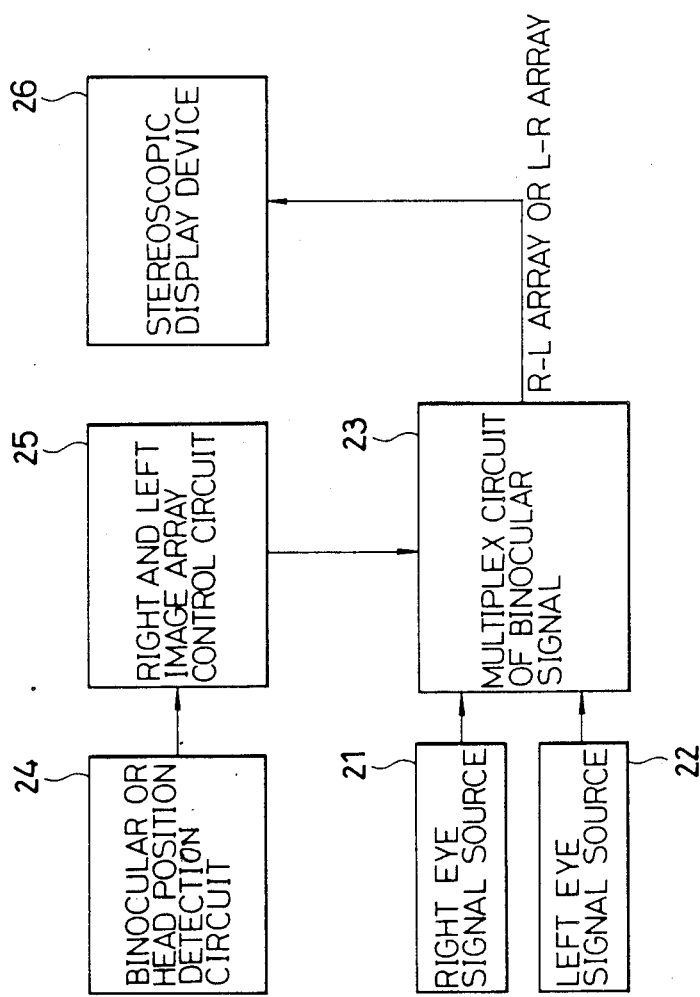
FIG. 6 is a block diagram showing the arrangement of a direct viewing type display according to one embodiment of the present invention.

FIG. 6 is a block diagram showing an arrangement of the direct viewing type display. In FIG. 6, reference numerals 21 and 22 denote right and left eye signal sources of a binocular disparity signal source; 23, a multiplex circuit of binocular signals; 24 a binocular position detector circuit for detecting the binocular position of the viewer 5 shown in FIGS. 2 to 4; 25 a right and left image array control circuit for controlling an array of a combined image formed on a stereoscopic display device; and 26 a stereoscopic display device. The display device 26 consists of a combination of a lenticular lens sheet and a substantially flat liquid-crystal display device.

The operation of the system with the above arrangement will be described below. Signals from the right and left signal sources 21 and 22 of the binocular disparity signal source such as a television camera, a video disk player, a video tape recorder (VTR), or the like are combined by the multiplex circuit 23. In this case, the right and left image array control circuit 25 forms a signal for controlling an array of a combined image on the display device based on a binocular position signal as an output from the binocular or head position detecting circuit 24 which detects the binocular or head position of the viewer, and applies the signal to the multiplex circuit 23 to control a combination of the binocular signals. The resultant signal is applied to the stereoscopic display device 26 to control an array of R and L pixels on the combined image 1, as shown in FIGS. 3 or 4. Therefore, the viewer can experience stereoscopic viewing even if he or she moves to the right or left.

Figure 7:
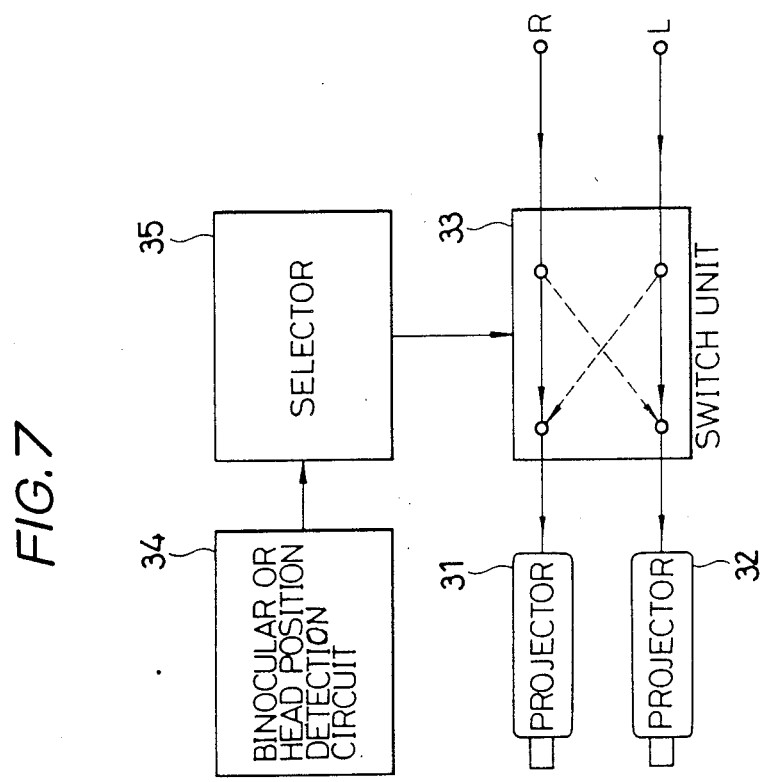
FIG. 7 is a block diagram showing the arrangement of a projection type display according to another embodiment of the present invention.

FIG. 7 is a block diagram showing the projection type display. In FIG. 7, reference numeral 31 denotes a projector for projecting a right eye signal; 32 a projector for projecting a left eye signal; 33 a switch unit for switching the right and left eye signal sources; 34 a binocular or head position detecting circuit; 35 a selector for controlling the switching operation of the switch unit 33; R, a right eye signal input terminal; and L, a left eye signal input terminal the terminals R and L being connected to switch unit 33.

The operation of the system with the above arrangement will be described below. Right and left eye signals from the binocular disparity signal source such as a television camera, a video disk player, a video tape recorder (VTR), or the like are input to the terminals R and L, respectively. In this case, the selector 35 selects signals to be input to the two projectors 31 and 32 on the basis of the binocular position signal from the binocular or head position detecting circuit 34, which detects the binocular or head position of the viewer, and controls the switch unit 33. For example, when the viewer 5 is located at the central position, as shown in FIG. 3, the signal at the terminal R is input to the projector 31 and the signal at the terminal L is input to the projector 32, so that R and L pixels are arrayed on the combined image 1 in the order shown in FIG. 3. When the viewer 5 moves to the right or left and is located, as shown in FIG. 4, the selector 35 controls the switch unit 33 to switch the input signals to the projectors 31 and 32, so that R and L pixels are arrayed on the combined image in the order shown in FIG. 4. Therefore, the viewer experiences stereoscopic viewing even if he or she moves to the right or left.

The method of generating stereoscopic viewing of the entire surface of a display over the viewing distance of a stereoscopic image by adhering a lenticular lens sheet on a substantially flat surface of the display will be described below.

Figure 8:
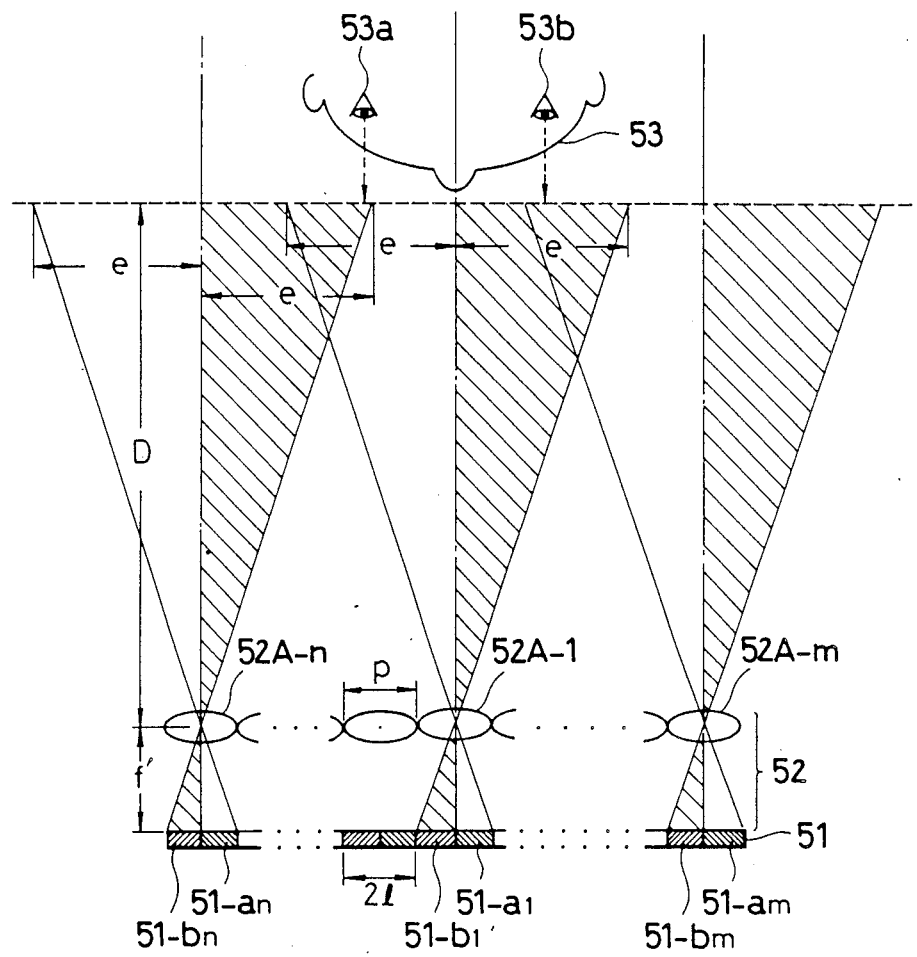
FIG. 8 is a top view for explaining the problem occurring when a pitch of the lenticular lens is equal to the pitch of a pair of pixels for right and left eye images.

FIG. 8 is a top view for explaining the above-mentioned problems of the present invention. For the sake of illustrative convenience, lenticular lenses are illustrated as convex lenses. The thickness of each lenticular lens corresponds to the product of the refractive index of the lenticular lens and the focal length f' of the lenticular lens. In FIG. 8, reference numeral 51 denotes a combined image consisting of pixels 51-a for a right eye image (R pixels) and pixels 51-b for a left eye image (L pixels) to display a stereoscopic image. The length of each R or L pixel is represented by l, and a repetitive pitch of pairs of R and L pixels is represented by 2l. Reference numeral 52 denotes a convex lens sheet constituted by a large number of convex lenses 52A. The pitch of the convex lenses 52A is represented by P, and the focal length is represented by f. Reference numeral 53 denotes a viewer who is located directly front of a display screen, and views an image at a distance D from the convex lenses 52A (For the sake of illustrative convenience, the two eyes are located farther than the position corresponding to the distance D but in practice the eyes situated at the distance D).

The R L pixel is projected to have a size e at the stereoscopic viewing distance D. In FIG. 8, the pitch 2l of the pairs of R and L pixels is equal to the pitch P of the convex lenses. In this case, an R pixel 51-a$_1$ the center pair of R and L pixels (51-a$_1$ and 51-b$_1$) is projected to the right eye 53a of the viewer 53 at the distance D, and the L pixel 51-b$_1$ is projected to the a left eye 53b, thus producing stereoscopic viewing. However, the R pixel 51-a$_m$ at the right end portion of the screen is projected to the left eye 53b of the viewer 53, and the L pixel 51-b$_m$ is projected to neither eye at the right end portion of the screen thus disturbing stereoscopic viewing. The same applies to a pair of R and L pixels (51-a$_n$ and 51-b$_n$) at the left end portion of the screen, which also causes stereoscopic viewing to be disturbed. That is, if the pitch 2l of the pairs of R and L pixels is set to be equal to the pitch P of the convex lenses 52A, the viewer 53 cannot have stereoscopic viewing on the entire display screen.

Figure 9:
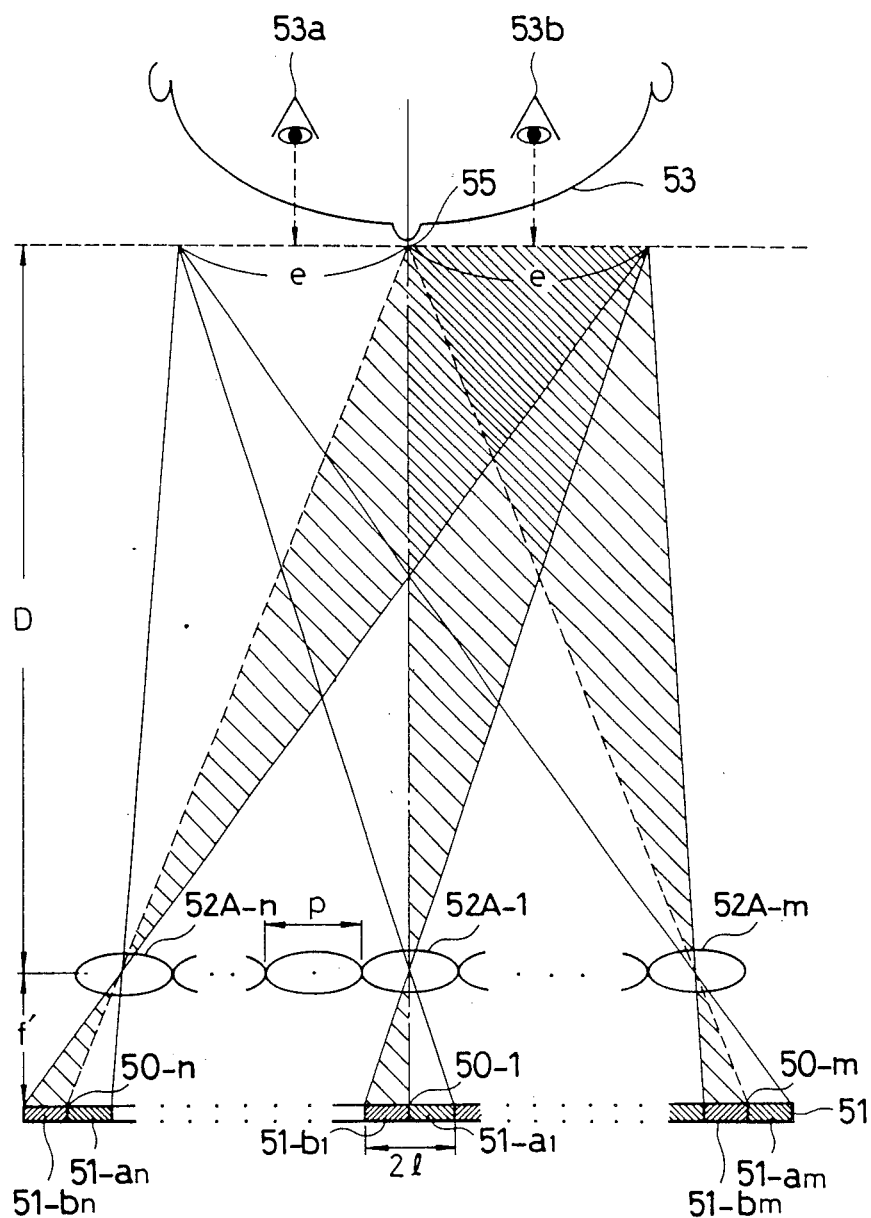
FIG. 9 is a top view of an embodiment whose optical characteristics assures stereoscopic viewing of the entire display screen according to the present invention.

FIG. 9 shows another embodiment of the present invention which explains optical characteristics of the convex lenses 52A and the combined image 51 and produces stereoscopic viewing on the entire display screen. FIG. 9 illustrates lenticular lenses as convex lenses as in FIG. 8. In FIG. 9, the viewer 53 is located directly in front of the display screen, and views an image at the distance D from the convex lenses 52A. Although the two eyes 53a and 53b are located farther than the position corresponding to the distance D, for illustrative convenience, as in FIG. 8, in practice the two eyes are located at the position of the distance D. The main difference from FIG. 8 is that in FIG. 9 the pitch P of the convex lenses 52A is set to be slightly smaller than the pitch 21 of the pair of R and L pixels, so that centers 50 of all the pairs of R and L pixels are projected to a center 55 between the two eyes at the distance D. To obtain the value of P, the following equation is used:

$$P = 2l \cdot D/(D+f) \quad (1)$$

For example, the pitch 21 of the pairs of R and L pixels is 0.4 mm, the stereoscopic viewing distance D is 500 mm, and the focal length f of the convex lens is 1.56 mm, the pitch P of the convex lenses allowing stereoscopic viewing on the entire screen is about 0.3988 mm. The stereoscopic visible area e at the distance D, the focal length f of the convex lens, and the length l of the R or L pixel, may be determined by the following equation:

$$f = l \cdot D/e \quad (2)$$

In equation (2), for example, if $f = 1.56$ mm, $D = 500$ mm, and $l = 0.2$ mm, the stereoscopic visible area e is about 64 mm.

The average interval between the two eyes of a person is about 64 mm. Therefore, when the R or L pixel is enlarged and projected at a distance which approximately corresponds to the distance between the two eyes of a person, a maximum visible area be obtained and the viewer can experiences stereoscopic viewing over the entire screen of the display.

This method can be applied to either the direct viewing display or the projection type display.

In the above embodiment, each L and R pixel corresponding to one lenticular lens is constituted by one pixel. In this case, when the viewer moves to the right or left while the distance between the viewer and the lenticular lens sheet remains the same, the binocular position of the viewer is detected, which then switches the positions of the R and L pixels on the combined image, thus continuously providing stereoscopic viewing. However, when the viewer moves to the right or left with a forward or backward offset, an area incapable of stereoscopic viewing is formed. This can be corrected the L and R pixels corresponding to one lenticular lens is constituted by a plurality of micropixels (e.g., two micropixels for each of the R and L pixels; a total of four micropixels), thus expanding the stereoscopic viewing.

Figure 10A:
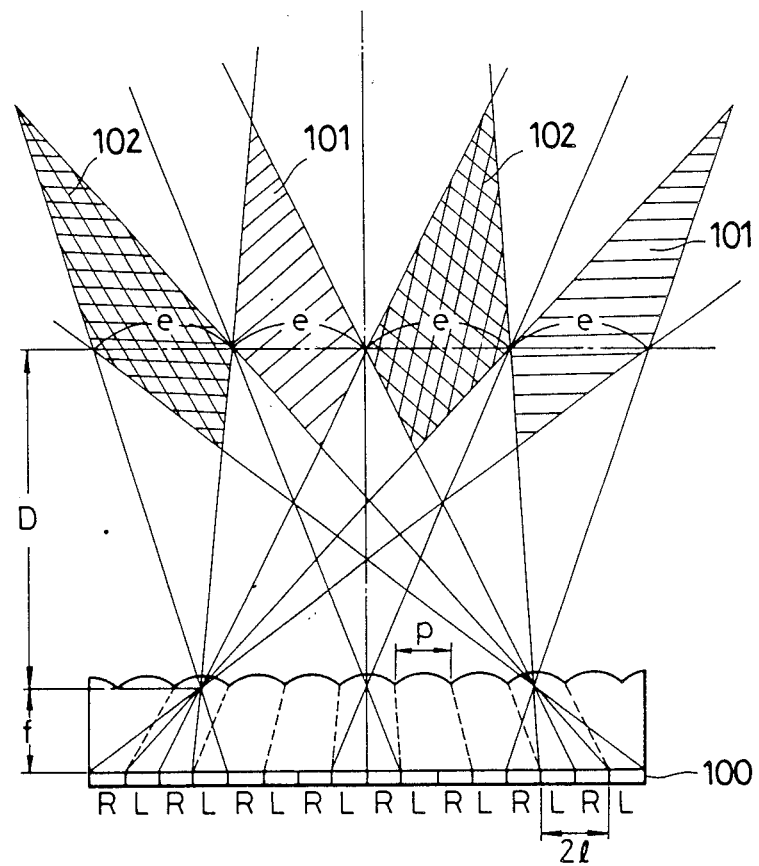
FIGS. 10(A) and 10(B) are top views showing areas regions capable of receiving stereoscopic viewing when a pair of pixels for right and left eye images correspond to one lenticular lens.

FIG. 10 shows a case wherein one pitch of the lenticular lenses corresponds to a pair of R and L pixels each composed of one pixel, and is equal to the case of FIG. 9. In FIG. 10, reference symbol P denotes a pitch of the lenticular lenses; f, a focal length of the lenticular lens; D, a stereoscopic viewing distance; and 21, a pitch of a pair of R and L pixels, which is slightly larger than the pitch P of the lenticular lenses. Reference symbol e denotes a stereoscopic visible area substantially corresponding to the distance between the two eyes of the viewer. Reference numeral 101 denotes areas capable of viewing the R pixels; and 102, areas capable of viewing the L pixels.

Figure 10B:
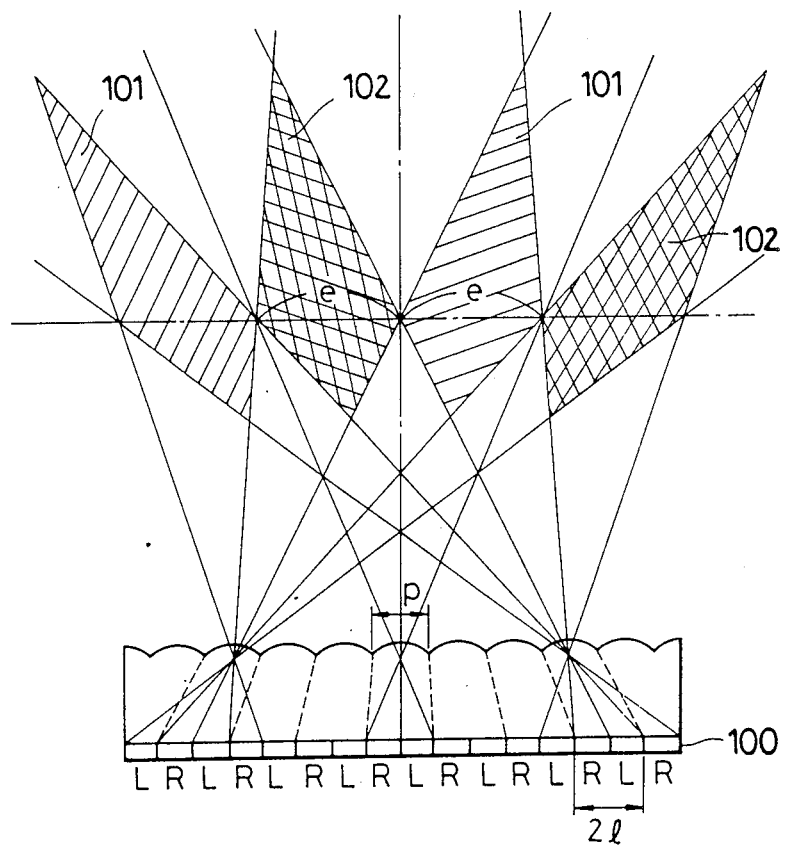
Figure 11A:
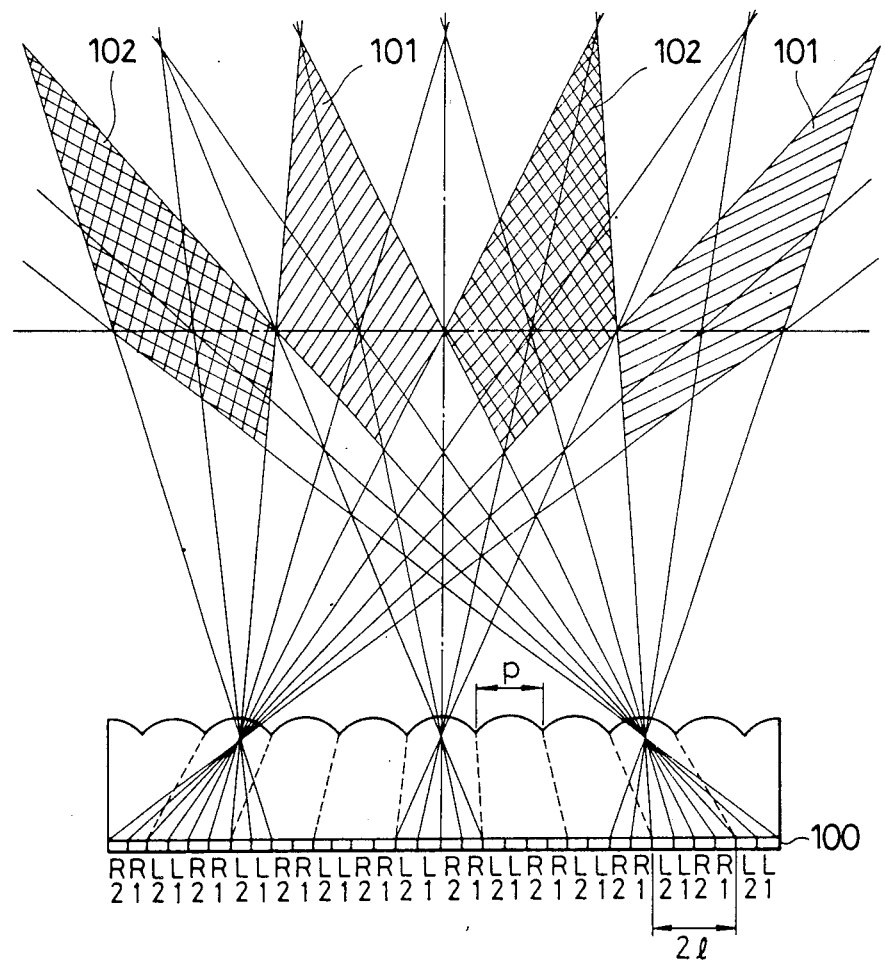
FIGS. 11(A)–11(D) are views showing regions capable of receiving stereoscopic viewing when each of pixel for the right and left eye images is constituted by two micropixels in correspondence with one lenticular lens in order to expand the region of stereoscopic viewing.
Figure 11B:
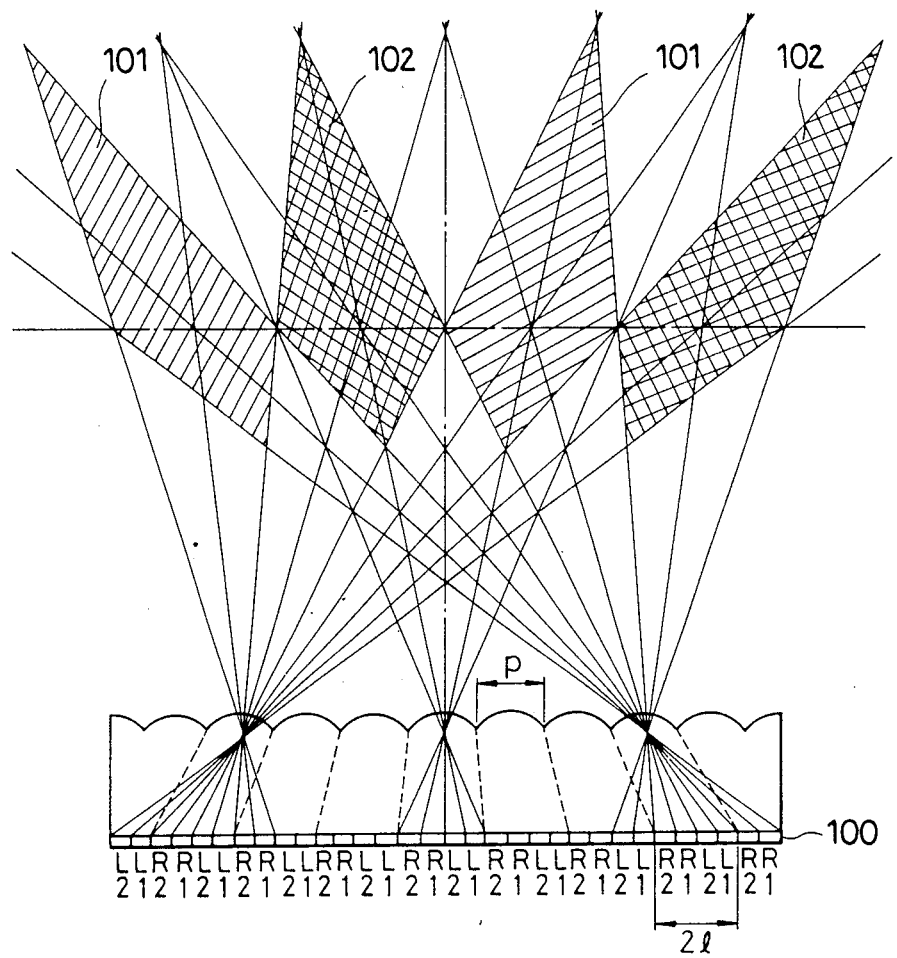
Figure 11C:
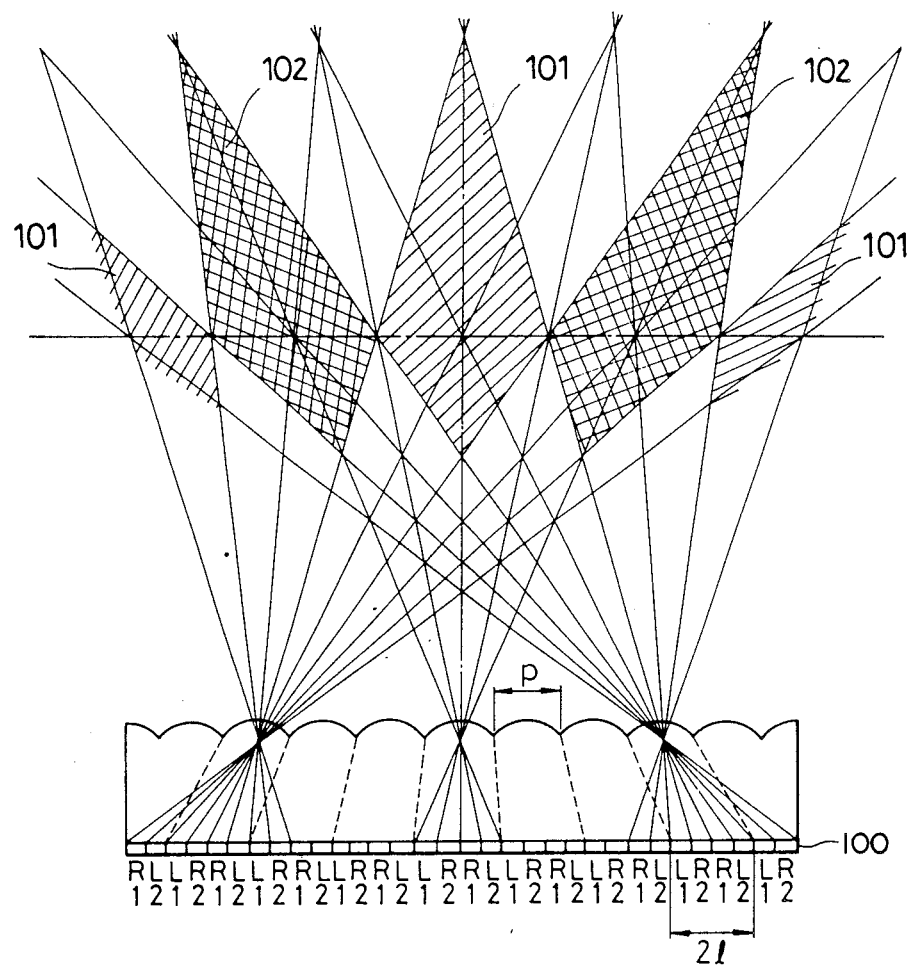
Figure 11D:
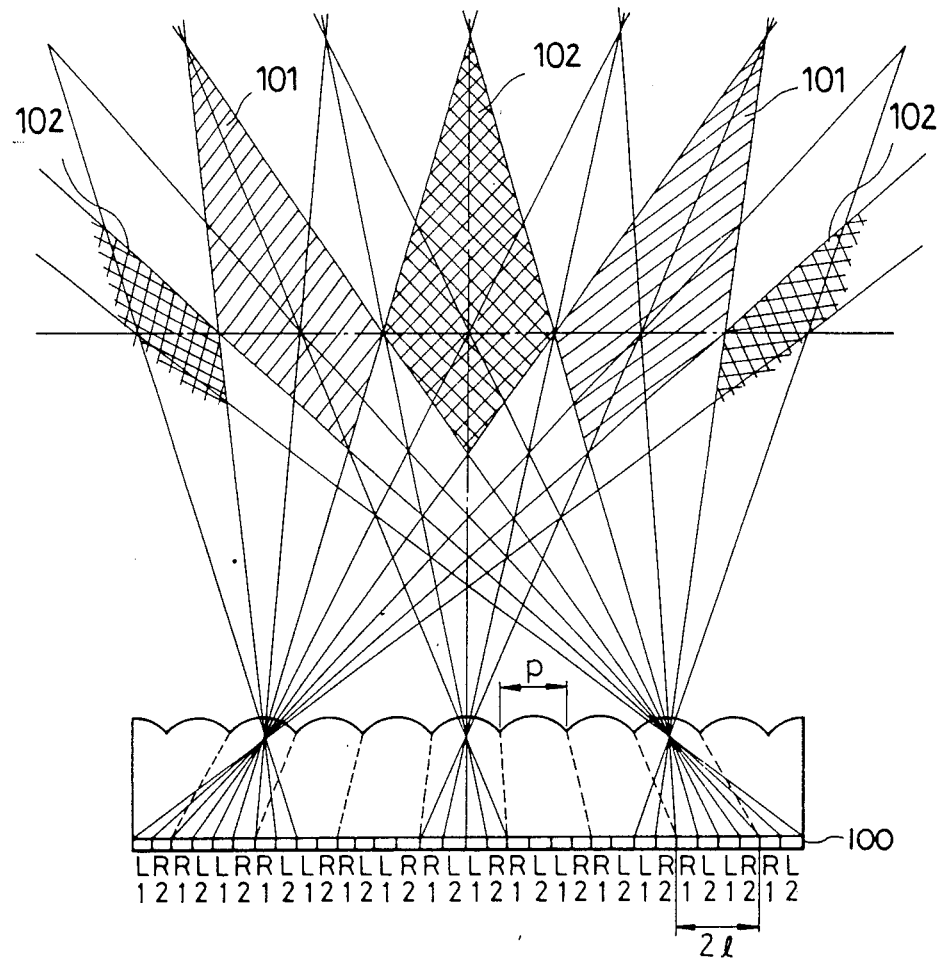

When the right eye of the viewer is present in an area 101 at the same time his left eye is present in an area 102, the viewer will experience stereoscopic viewing over the entire display screen. Therefore, if the viewer is located at the center of FIG. 10(A) (along a long and short dashed lines) and moves slightly moves forward or backward from the position corresponding to the distance D, stereoscopic viewing over the entire display screen can be assured. In FIG. 10(B) the binocular position of the viewer is at the distance D and the viewer moves to the right or left, the array of the R and L pixels is switched according to the binocular position of the viewer, thus continuously assuring stereoscopic viewing. However, when the viewer moves to the right or left with a forward or backward offset from the position of the stereoscopic viewing distance D, even if the array of a combined image 100 is switched, as in FIG. 10(B), one or both of the right and left eyes fall outside the areas 101 and 102, and an area incapable of stereoscopic viewing is formed.

FIG. 11 shows the embodiment for expanding an area capable of stereoscopic viewing, wherein one pitch of the lenticular lenses corresponds to a pair of R and L pixels each constituted by two pixels. If two R pixels are represented by $R_1$ and $R_2$ and two L pixels are represented by $L_1$ and $L_2$, four combinations of arrays, i.e., $R_1$-$R_2$-$L_1$-$L_2$, $L_1$-$L_2$-$R_1$-$R_2$, $L_2$-$R_1$-$R_2$-$L_1$, are obtained. The four combinations of arrays are shown in FIGS. 11(A) and 11(B). 11(C) and (11)D of the areas 101 and 102 differ depending on the four combinations of arrays. Therefore, upon switching the four combinations, the of the areas 101 and 102 up to the ranges added at shown in FIGS. 11(A), 11(B), 11(C) and 11(D). More specifically, even if the viewer moves to the right or left while his two eyes are offset forward or backward from the position of the stereoscopic viewing distance D, the binocular position of the viewer is detected which to switches the four combinations of arrays, thus continuously assuring stereoscopic viewing.

If the number of micropixels constituting each of the R and L pixels corresponding to one lenticular lens is increased, ranges capable of stereoscopic viewing can be further expanded over the entire display screen.

What is claimed is:

1. A method of stereoscopic image display for providing right and left eye images to right and left eyes of the viewer using a viewing lenticular lens sheet constituted by an array of lenticular lenses on which is disposed a combined image obtained by combining pixels for the right and left eye images having binocular disparity data, said method comprising the steps of:

detecting a position of the viewer; and
   changing positions of the pixels for the right and left eye images on the combined image in accordance with the detected position of the viewer, so that the right and left eye images are always correctly provided to the right and left eyes of the viewer.

2. A method according to claim 1, wherein technique is realized by an arrangement in which a repetitive said lenticular lenses of said lenticular lens sheet are formed with a repetitive pitch smaller than a repetitive pitch of pairs of pixels for the right and left eye images on said combined image.

3. A method according to claim 1 or 2, wherein each one of said lenses corresponds to a respective pair of pixels for the right and left eye images on the combined image, and the step of changing the positions of the pixels for the right and left eye images on said combined image includes the step of replacing the positions of the pixels for the left and right eye images.

4. A method according to claim 1 or 2, wherein each of the pixels for the right and left eye images corresponds to a respective one of said lenses and is constituted by a plurality of micropixels, and the step of changing the positions of the pixels for the right and left eye images on said combined image is executed in units of micropixels.

5. A method according to claim 1 or 2, where said combined image is formed by right and left eye images displayed by a display device arranged behind a rear surface of said viewing lenticular lens sheet.

6. A method according to claim 1 or 2, wherein said combined image is formed by focusing right and left eye images projected from a plurality of projectors arranged on the same side of the lens as the viewer on a diffusive layer arranged on a rear surface of said viewing lenticular lens sheet by said lenticular lenses of said viewing lenticular lens sheet.

7. A method according to claim 1 or 2, wherein the combined image is formed by focusing the right and left eye images projected from a plurality of projectors arranged on the side of the lens opposite the viewer on a diffusive layer arranged on a rear surface of said viewing lenticular lens sheet by lenticular lenses of a second lenticular lens sheet having the same characteristics as that of the first said lenticular lens sheet.

* * * * *